UNITED STATES PATENT OFFICE.

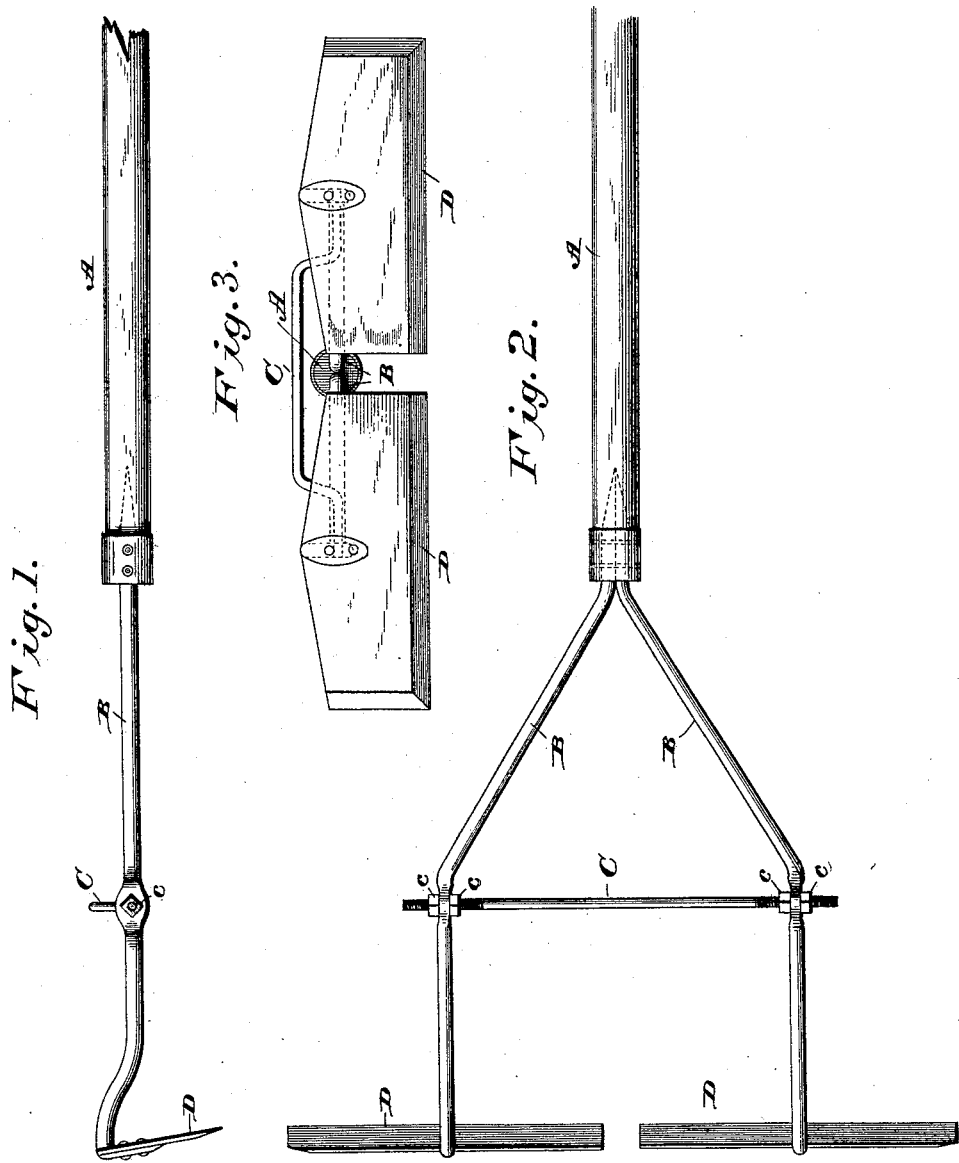

HENRY M. BROWN, OF ELKHART, TEXAS, ASSIGNOR OF ONE-HALF TO WILLIAM J. BRIDGES, OF SAME PLACE.

HOE.

SPECIFICATION forming part of Letters Patent No. 452,746, dated May 19, 1891.

Application filed January 3, 1891. Serial No. 376,602. (No model.)

*To all whom it may concern:*

Be it known that I, HENRY M. BROWN, a citizen of the United States of America, residing at Elkhart, in the county of Anderson and State of Texas, have invented certain new and useful Improvements in Hoes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in hoes; and it consists in the construction and combination of the parts, as will be hereinafter fully set forth, and particularly pointed out in the claim.

In the accompanying drawings, forming part of this specification, Figure 1 is a side view of a hoe constructed in accordance with my invention. Fig. 2 is a plan view, and Fig. 3 a front view.

A refers to the handle, which is of ordinary construction, being provided at its lower end with a ferrule through which one or more rivets pass for connecting thereto the rods or shanks B, which support the hoe-blades. These rods diverge from the handle and are enlarged centrally and provided with perforations through which the ends of an arched brace-bar C passes, said bar being screw-threaded and provided on each side of the shanks B with nuts or thumb-screws $c$ $c$. The ends of the shanks B are bent downward, and to which are secured the blades D, said blades being sharpened on their under and outer edges.

A hoe thus constructed is simple, and is especially adapted for working between rows of plants, as with the same the ground can be worked on each side of the plant without disturbing the same, and a person may hoe on each side of a row with one operation.

When it is desired to adjust the hoe-blades laterally, it can be accomplished by adjusting the nuts or thumb-screws. The shanks B, being made of steel, will give sufficiently to permit of such adjustment.

The inner edges of the hoe-blades are left unsharpened, so that they will be less liable to injure the plants, while the outer vertical edges are sharpened, so that the edges of the hoe-blades may be used when desired.

Having thus described my invention, I claim—

In a double-bladed hoe, a handle carrying shanks B B, said shanks diverging from said handle and then bent to be parallel with each other, and hoe-blades D D, attached to the downwardly-bent ends of said shanks, said shanks being enlarged and provided with apertures through which pass the ends of a connecting-rod C, said rod having a central portion bent upwardly, the ends thereof being threaded and provided with locking-nuts, substantially as shown, and for the purpose set forth.

In testimony whereof I affix my signature in presence of two witnesses.

HENRY M. BROWN.

Witnesses:
D. B. HIGGINBOTHAM,
JOHN PARKER, Jr.